Feb. 25, 1964     W. G. BRANTLEY ETAL     3,121,974
POWER TREE CHIPPER AND SPRAYER
Filed April 10, 1962     3 Sheets-Sheet 1
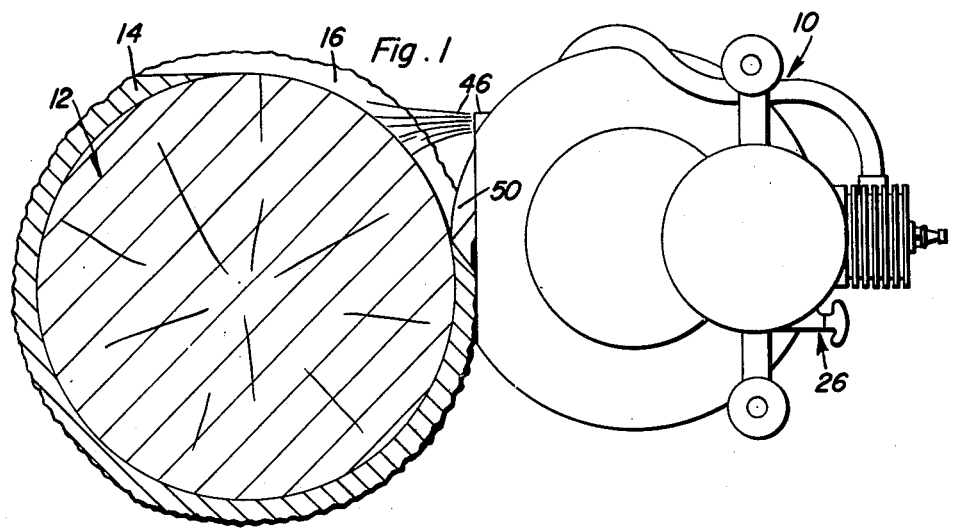
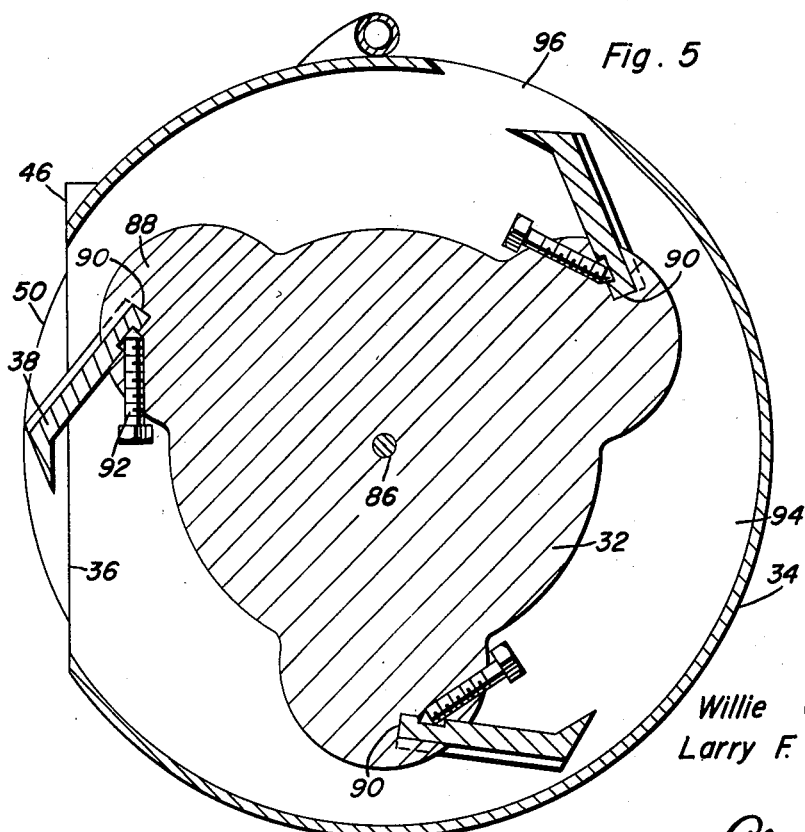
Willie G. Brantley
Larry F. Brantley
INVENTORS

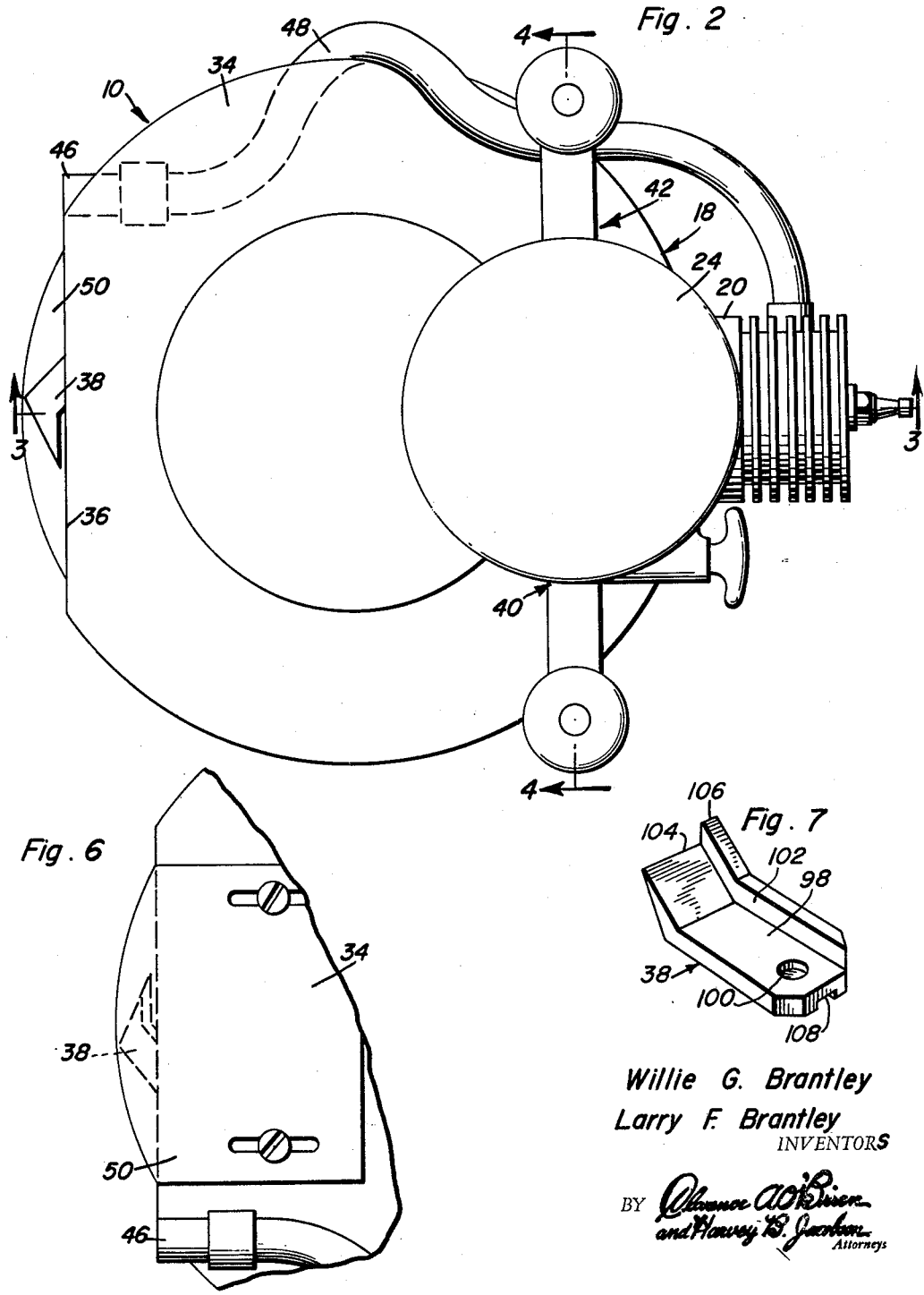

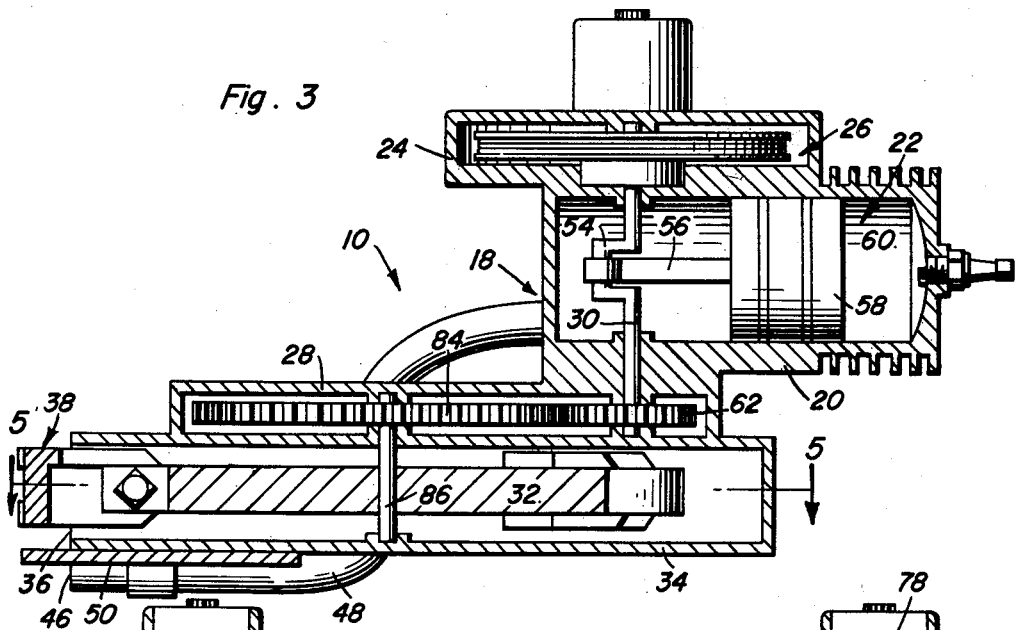
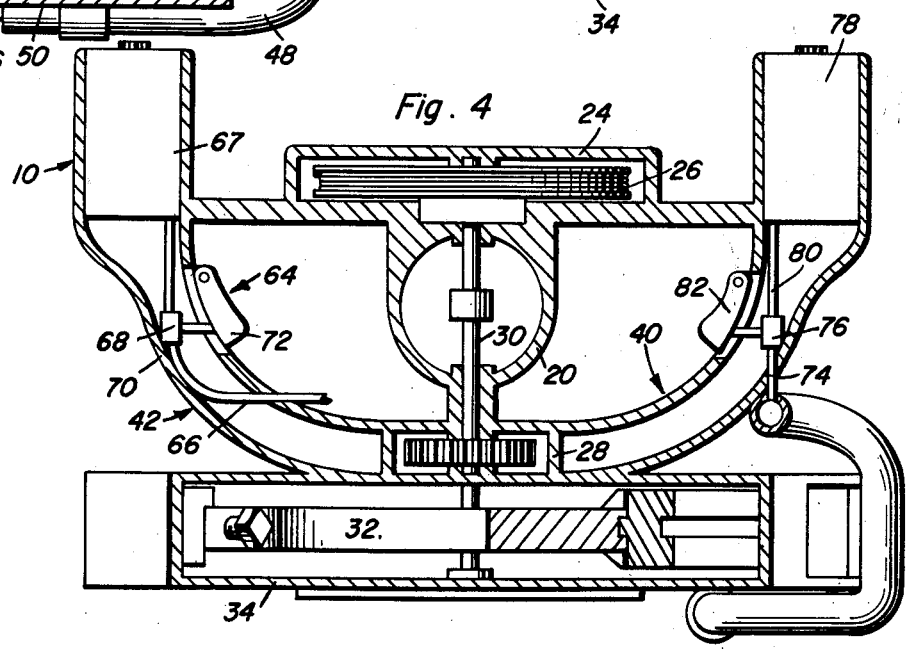

United States Patent Office 3,121,974
Patented Feb. 25, 1964

3,121,974
POWER TREE CHIPPER AND SPRAYER
Willie G. Brantley and Larry F. Brantley, both of
Rte. 2, Box 102, Wrightsville, Ga.
Filed Apr. 10, 1962, Ser. No. 186,483
14 Claims. (Cl. 47—12)

This invention relates to portable apparatus for harvesting crude gum from trees by chipping the bark therefrom and spraying the streaks or tree wounds with sap flow-stimulating acid.

Portable apparatus has heretofore been devised for the purpose of treating pine trees or the like in order to extract raw gum therefrom by producing streaks or cuts on the trunk of the tree followed by the application of an acid spray to the sap-exuding face exposed by the tree wound so as to stimulate the flow of gum-bearing sap. In view of the relative inaccessibility of the trees to be so treated, the replacement of hand operations by power tools has necessarily been restricted to portable types of equipment. Also, in connection with the use of power equipment producing dust and chips at a rapid rate, contamination of the gum-bearing sap has become a problem. It is therefore a primary object of the present invention to provide portable apparatus better able to cope with the aforementioned objectives and problems.

An important object of the present invention therefore, is to provide a power operated tree chipping and spraying device mounted within a single portable housing assembly to thereby avoid prior portable equipment arrangements wherein the power unit is carried on one's back. The portable device of the present invention is therefore of such novel construction and arrangement as to render it completely portable and completely supported by the hands of the user without the expenditure of undue effort so that work may be performed with a greater degree of safety and to enable the user to carry the apparatus more easily through wooded areas having low-hanging vines, branches, etc.

In accordance with the foregoing objects, the portable device of the present invention utilizes a relatively large rotor for mounting cutter blades for cutting stabilization thereof and to enable the reduction in the size of the power unit because of the flywheel action of the rotor.

A further object of the present invention in accordance with the foregoing object, is to provide a more complete guard or shield for the rotor mounted cutter blades not only for protective purposes, but also to direct chips for discharge away from the sap-collecting buckets to thereby prevent contamination of the gum-bearing sap.

Additional objects of the present invention include the mounting of an adjustable depth control device below the blade exposing opening of the rotor housing portion so as to regulate the depth of cut. Also, the cutter blades are so shaped in connection with their additional function in impelling the chips in a direction away from the tree to prevent contamination of the sap, that clogging is less likely to occur.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the portable power device of the present invention shown in an operative position.

FIGURE 2 is an enlarged top plan view of the portable power device.

FIGURE 3 is a sectional view taken substantially through a plane indicated by section line 3—3 in FIGURE 2.

FIGURE 4 is a sectional view taken substantially through a plane indicated by section line 4—4 in FIGURE 2.

FIGURE 5 is a sectional view taken substantially through a plane indicated by section line 5—5 in FIGURE 3.

FIGURE 6 is a partial bottom plan view of the device showing the depth control feature.

FIGURE 7 is a perspective view of one of the cutter blade inserts.

Referring now to the drawings in detail, it will be observed from FIGURE 1, that the portable power device of the present invention generally referred to by reference numeral 10 when held in a horizontal position may be applied to the trunk 12 of a tree from which the bark 14 is to be cut to expose a sap-exuding face 16 so that gum-bearing sap may be collected within buckets as is well known in the art. The face 16 after being cut is therefore sprayed with a strong mineral acid such as sulfuric acid in order to stimulate the flow of sap therefrom. The portable power device 10 is therefore operative to both cut the bark 14 and apply acid to the exposed face 16. The portable power device 10 is therefore designed to be sufficiently portable as to enable one to carry the machine for prolonged periods of time but unlike comparable portable machines heretofore utilized, the machine 10 avoids back carried components and is capable of more efficiently discharging bark chips a sufficient distance away from the tree trunk as to avoid contamination of the gum-bearing sap collected.

Referring therefore to FIGURES 2, 3 and 4 in particular, it will be observed that the machine 10 includes a single housing assembly generally referred to by reference numeral 18 containing all of the machine components. The housing assembly includes an engine casing portion 20 within which is mounted a one-half horsepower, two cycle, air-cooled internal combustion engine generally referred to by reference numeral 22. A housing portion 24 is secured to the engine casing 20 on top thereof and mounts therewithin a pull type starter mechanism 26 of a type well known to those skilled in the art. Connected to the bottom end of the engine casing 20, is a reduction gear case 28 within which reduction gearing is mounted for drivingly connecting the engine power shaft 30 to a rotor assembly 32 mounted within a rotor enclosing shield portion 34 of the housing. The rotor shield portion 34 of the housing is dimensionally enlarged in the rotational plane of the rotor assembly and extends forwardly from the engine casing 20 to present a blade-exposing opening 36 through which cutting blades 38 which are mounted on the rotor assembly 32, are exposed for bark-chipping purposes. Connected to the reduction gear case 28 and the starter housing portion 24, are a pair of handle assemblies 40 and 42 by means of which the entire housing assembly 18 enclosing and supporting all of the components of the machine 10, may be grasped, carried and directed so that the cutter blades 38 exposed through the opening 36 may cut the tree bark as described with respect to FIGURE 1. Accordingly, mounted adjacent to the cutter blade exposing opening 36 is the outlet end 46 of an acid spray conduit 48 connected to the exhaust of the engine 22 and into which the acid spray is introduced. Mounted below the opening 36 in the rotor casing portion 34, is a depth control member 50 as more clearly seen in FIGURE 6. The depth control member 50 therefore projects forwardly from the housing portion 34 by an amount adjusted so as to limit the depth of cut by the rotor mounted cutter blades 38. It will therefore be apparent that the machine may be started up and manually held in the horizontal position illustrated in FIGURE 1 with the depth control member 50 up against the tree trunk so that the bark may be cut therefrom and an acid spray applied.

As more clearly seen in FIGURES 2 and 3, the engine 22 is started up by the starter mechanism 26 which includes the starter pull handle 52 arranged to impart rotation to the power shaft 30 of the engine 22 connected by the crank arm 54 to the piston rod 56 for reciprocation of the piston 58 within the engine cylinder 60 of a conventional type two cycle engine. The power shaft 30 therefore extends in a vertical direction connected at its upper end to the starter mechanism 26 and at its lower end to a pinion gear 62 within the reduction gear casing 28. A fuel mixture is therefore supplied to the engine 22 by a carburetor device 64 as seen in FIGURE 4, to which a fuel line 66 is connected. The fuel line 66 is therefore also connected to a fuel tank or reservoir 67 through a cut-off valve mechanism 68 of any suitable type known to those skilled in the art. The cut-off valve 68 is located within the handgrip portion 70 of the handle assembly 42 so that it may be actuated for fuel cut-off purposes by means of a finger trigger element 72 mounted on the handgrip portion. The upper end of the handgrip portion 70 therefore mounts the fuel tank 67 with the fuel line 66 extending through the handgrip portion for cut-off control by the cut-off valve 68. The engine exhaust is therefore conducted through the conduit 48 and is utilized for inducing flow of the acid spray out the end 46 of the conduit as hereinbefore indicated. Accordly, the other handle assembly 40 also includes a handgrip portion 74 within which there is mounted a liquid spray supply valve 76 that connects a vented acid supply tank 78 with the flow-inducing exhaust conduit 48 through the acid supply line 80. The acid supply valve 76 is therefore actuated for such purpose by means of a manual trigger element 82 mounted on the inside portion of the handgrip 74 of the handle assembly 40. It will therefore be apparent that upon starting of the engine through the starter mechanism 26, not only will the cutter blades 38 be rotated but upon selective actuation of the valve 76 by the trigger element 82, an acid spray may be applied. Also, when it is desired to stop operation of the machine, actuation of the trigger element 72 and the cut-off valve 68, will stop the supply of fuel to the engine.

As hereinbefore indicated, the weight of the machine 10 must be as low as possible for which reason the housing assembly 18 is preferably made of a light weight metal such as aluminum with the size and hence power rating of the engine 22 utilized, maintained as low as possible. The power output shaft 30 is therefore geared to the rotor assembly 32 by a high reduction gear which includes the large gear member 84 in mesh with the pinion gear 62 connected to the lower end of the power shaft. The gear member 84 is therefore conneted through the shaft 86 to the relatively large rotor assembly having radially projecting portions 88 as more clearly seen in FIGURE 5 on which the cutter blades 38 are mounted. Accordingly, the radially projecting portions of the rotor 32 include blade receiving slots 90 for receiving the cutter blades therein and threaded mount setscrew elements 92 for securely holding the cutter blades in place. Rotation of the rotor 32 is a counterclockwise direction as viewed in FIGURE 5, will therefore successively expose cutter blades 38 through the opening 36 to chip bark from the tree trunk at a proper depth controlled by the depth control member 50 with the bark chips being impelled through the annular passage 94 formed between the walls of the rotor casing portion 34 and the rotor 32 for discharge out the chip discharge opening 96 in the rotor casing 34 circumferentially spaced from the cutter exposing opening 36. Accordingly, the bark chips are expelled in a direction away from the tree trunk to avoid contamination of the gum-bearing sap as aforementioned.

The cutter blades 38 as more clearly seen in FIGURE 7 therefore include a body portion 98 the forward side of which has a recess 100 for receiving the setscrew element 92. Projecting forwardly in the direction of rotation from the upper edge of the blade body 98, is the portion 102 disposed at 90 degrees to the body portion 98 arranged to prevent clogging of the blade 38 as it impels the chips forwardly thereof toward the discharge opening 96. Cutting edges 104 and 106 are therefore provided at the forward ends of the blades for bark chipping purposes. The rear side of the blade body 98 is provided with a groove 108 for properly positioned insertion of the blade within the recess 90 of the rotor.

From the foregoing description, the operation and utility of the power-operated portable chipper and spraying machine of the present invention will be apparent. It will therefore be appreciated, that the novel construction of the present invention involves a machine capable of performing the functions of comparable machines with a greater degree of safety because of the mounting of all of the components within one housing assembly. Because of the relatively large rotor and the novel arrangement of the components within the housing assembly, a machine weighing approximately 7½ lbs. has been constructed which is sufficiently light to enable one to perform the work for which the machine is designed, without tiring. Also, in view of the more complete shielding of the rotor assembly which mounts the cutter blades, and its relatively large dimension, greater stability may be obtained for the machine by proper dynamic balancing of the rotor and discharge of cuttings may be effected without contamination of the tree sap.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable tree bark chipper and sprayer, comprising, power means, rotor means directly driven by the power means and mounting cutter means, housing means completely enclosing and supporting both said power means and rotor means while exposing said cutter means at one cutter exposing location, handle means connected to said housing means for manual support and direction thereof, fluid flow control means mounted on said handle means, spray applying means mounted on said housing means and operatively connected to said power means and fluid flow control means for directing spray substantially from said location on the housing means in response to operation of said power means and actuation of the flow control means, said housing means including an engine casing operatively mounting said power means having a vertically extending power shaft journalled therein, rotor shielding means rotatably mounting said rotor means below the engine casing in parallel offset relation thereto and having a blade exposing opening laterally spaced from said engine casing and said cutter exposing location on the housing, gear casing means connecting said engine casing to the rotor shielding means and rotatably mounting reduction gear means for drivingly connecting said power shaft to the rotor means, said handle means being connected to the gear casing means for manual direction of the blade exposing opening in the rotor shielding means disposed therebelow, said handle means further including a pair of handgrip portions connected to the housing means on opposite sides of the power means, and liquid reservoir means mounted on upper ends of said handgrip portions for respectively supplying fuel and flow stimulating acid to the power means and spray means.

2. The combination of claim 1 wherein said fluid flow control means includes fuel cut-off valve means for stopping operation of the power means.

3. The combination of claim 2, wherein said spray applying means includes exhaust conduit means operatively connected to said power means for conducting flow inducing exhaust gases therefrom, said conduit means including an outlet end located adjacent to said cutter exposing location on the housing means rearwardly of the cutter means exposed therethrough.

4. The combination of claim 3, wherein said housing means is formed with a discharge opening spaced from said cutter exposing location.

5. The combination of claim 4 including depth guide means adjustably mounted on the housing means below said cutter exposing location.

6. The combination of claim 5, wherein said cutter means comprises a plurality of blades mounted on radially projecting portions of said rotor means, each of said blades including an insertable blade body, a radially outer cutting end portion projecting forwardly of the body in the direction of rotation of the rotor means for impelling chips into the housing means for discharge through said discharge opening, and an upper chipping edge portion projecting forwardly of the blade body.

7. A portable tree bark chipper and sprayer, comprising power means, rotor means directly driven by the power means and mounting cutter means, housing means completely enclosing and supporting both said power means and rotor means while exposing said cutter means at one cutter exposing location, handle means connected to said housing means for manual support and direction thereof, fluid flow control means mounted on said handle means, spray applying means mounted on said housing means and operatively connected to said power means and said fluid flow control means for directing spray substantially from one location on the housing means in response to operation of said power means and actuation of the flow control means, said handle means including a pair of handgrip portions connected to the housing means on opposite sides of the power means, and liquid reservoir means mounted on upper ends of said handgrip portions for respectively supplying fuel and flow stimulating acid to the power means and spray means.

8. The combination of claim 7, wherein said fluid flow control means includes cut-off valves mounted in said handle means for stopping flow of said fuel to the power means and admitting liquid acid to the spray applying means.

9. The combination of claim 8, wherein said spray applying means includes exhaust conduit means operatively connected to said power means for conducting flow inducing exhaust gases therefrom, said conduit means including an outlet end located adjacent to said cutter exposing location on the housing means rearwardly of the cutter means exposed therethrough.

10. A portable tree bark chipper and sprayer, comprising power means, rotor means directly driven by the power means and mounting cutter means, housing means completely enclosing and supporting both said power means and rotor means while exposing said cutter means at one cutter exposing location, handle means connected to said housing means for manual support and direction thereof, fluid flow control means mounted on said handle means, spray applying means mounted on said housing means and operatively connected to said power means and said fluid flow control means for directing spray substantially from one location on the housing means in response to operation of said power means and actuation of the flow control means, said handle means including a pair of handgrip portions connected to the housing means on opposite sides of the power means, and liquid reservoir means mounted on upper ends of said handgrip portions for respectively supplying fuel and flow stimulating acid to the power means and spray means, said housing means being formed with a discharge opening spaced from said cutter exposing location.

11. The combination of claim 10, wherein said cutter means comprises a plurality of blades mounted on radially projecting portions of said rotor means, each of said blades including an insertable blade body, an outer cutting end portion projecting forwardly of the body in the direction of rotation of the rotor means for impelling chips into the housing means for discharge through said discharge opening.

12. A portable tree bark chipper and sprayer, comprising power means, rotor means directly driven by the power means and mounting cutter means, housing means completely enclosing and supporting both said power means and rotor means while exposing said cutter means at one cutter exposing location, handle means connected to said housing means for manual support and direction thereof, fluid flow control means mounted on said handle means, spray applying means mounted on said housing means and operatively connected to said power means and said fluid flow control means for directing spray substantially from one location on the housing means in response to operation of said power means and actuation of the flow control means, said handle means including a pair of handgrip portions connected to the housing means on opposite sides of the power means, and liquid reservoir means mounted on upper ends of said handgrip portions for respectively supplying fuel and flow stimulating acid to the power means and spray means, and depth guide means adjustably mounted on the housing means below said cutter exposing location.

13. A portable tree bark chipper and sprayer, comprising power means, rotor means directly driven by the power means and mounting cutter means, housing means completely enclosing and supporting both said power means and rotor means while exposing said cutter means at one cutter exposing location, handle means connected to said housing means for manual support and direction thereof, fluid flow control means mounted on said handle means, spray applying means mounted on said housing means and operatively connected to said power means and said fluid flow control means for directing spray substantially from one location on the housing means in response to operation of said power means and actuation of the flow control means, said handle means including a pair of handgrip portions connected to the housing means on opposite sides of the power means, and liquid reservoir means mounted on upper ends of said handgrip portions for respectively supplying fuel and flow stimulating acid to the power means and spray means, said spray applying means including exhaust conduit means operatively connected to said power means for conducting flow inducing exhaust gases therefrom, said conduit means including an outlet end located adjacent to said cutter exposing location on the housing means rearwardly of the cutter means exposed therethrough.

14. The combination of claim 13, wherein said housing means includes an engine casing operatively mounting said power means having a vertically extending power shaft journaled therein, rotor shielding means rotatably mounting said rotor means below the engine casing in parallel offset relation thereto and having a blade exposing opening laterally spaced from said engine casing at said cutter exposing location on the housing means, gear casing means connecting said engine casing to the rotor shielding means and rotatably mounting reduction gear means for drivingly connecting said power shaft to the rotor means, said handle means being connected to the gear casing means for manual direction of the blade exposing opening in the rotor shielding means disposed therebelow.

References Cited in the file of this patent
UNITED STATES PATENTS

| | | |
|---|---|---|
| 1,880,154 | Rotondo et al. | Sept. 27 1932 |
| 2,792,670 | Haynes | May 21, 1957 |
| 2,932,127 | Prance et al. | Apr. 12, 1960 |